United States Patent
Harada et al.

[19]

[11] Patent Number: 6,115,435
[45] Date of Patent: Sep. 5, 2000

[54] SOFT DECISION METHOD AND RECEIVER

[75] Inventors: Keisuke Harada; Masami Aizawa, both of Yokohama; Rumi Tanabe, Kamakura, all of Japan

[73] Assignees: Advanced Digital Television Broadcasting Laboratory, Tokyo; Kabushiki Kaisha Toshiba, Kawasaki, both of Japan

[21] Appl. No.: 08/960,669

[22] Filed: Oct. 30, 1997

[30] Foreign Application Priority Data

Oct. 31, 1996 [JP] Japan ................................. 8-290798

[51] Int. Cl.$^7$ .................................................. H03D 1/00
[52] U.S. Cl. ........................ 375/341; 375/262; 714/794; 714/795
[58] Field of Search ...................... 375/261, 262, 375/264, 265, 298, 303, 329, 341; 329/304; 332/103; 714/752, 786, 789, 792, 795, 794

[56] References Cited

U.S. PATENT DOCUMENTS

| | | | |
|---|---|---|---|
| 4,742,533 | 5/1988 | Weidner et al. | 375/331 |
| 4,882,733 | 11/1989 | Tanner | 714/752 |
| 5,321,725 | 6/1994 | Paik et al. | 375/265 |
| 5,363,408 | 11/1994 | Paik et al. | 375/261 |
| 5,654,986 | 8/1997 | Lim | 375/341 |

FOREIGN PATENT DOCUMENTS

| | | |
|---|---|---|
| 0052463 | 5/1982 | European Pat. Off. . |
| 8242264 | 9/1996 | Japan . |

*Primary Examiner*—Stephen Chin
*Assistant Examiner*—Chieh M. Fan
*Attorney, Agent, or Firm*—John P. White; Cooper & Dunham LLP

[57] ABSTRACT

When the received symbol is located (FIG. 4) within one of regions G, H, I, L, M, N, Q, R, and S, 2 bits are decided to be most reliable to obtain their soft decision values=0 or 7. As for the remaining 2 bits, a soft decision value=0 to 7 is decided by soft decision in the I- or Q-axis direction. When the received symbol is located within one of regions A, E, U, and Y, all the 4 bits are decided to obtain their soft decision values=0 or 7. When the received symbol is located with one of regions B, C, D, F, J, K, 0, P, T, V, W, and X, 3 bits are decided to be most reliable to obtain their soft decision values=0 or 7. As for the remaining 1 bit, a soft decision value=0 to 7 is obtained by soft decision in the I- or Q-axis direction. A soft decision method that can implement soft decision in multilevel (amplitude and/or phase) modulation and can fully exhibit the correction performance of maximum likelihood coding can be provided.

8 Claims, 7 Drawing Sheets

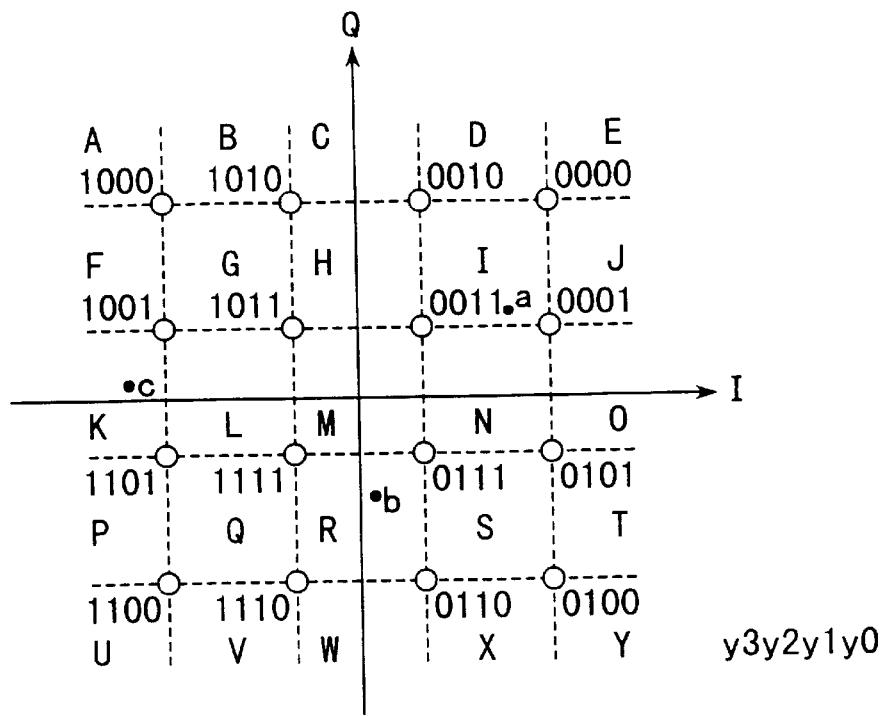
F I G. 4
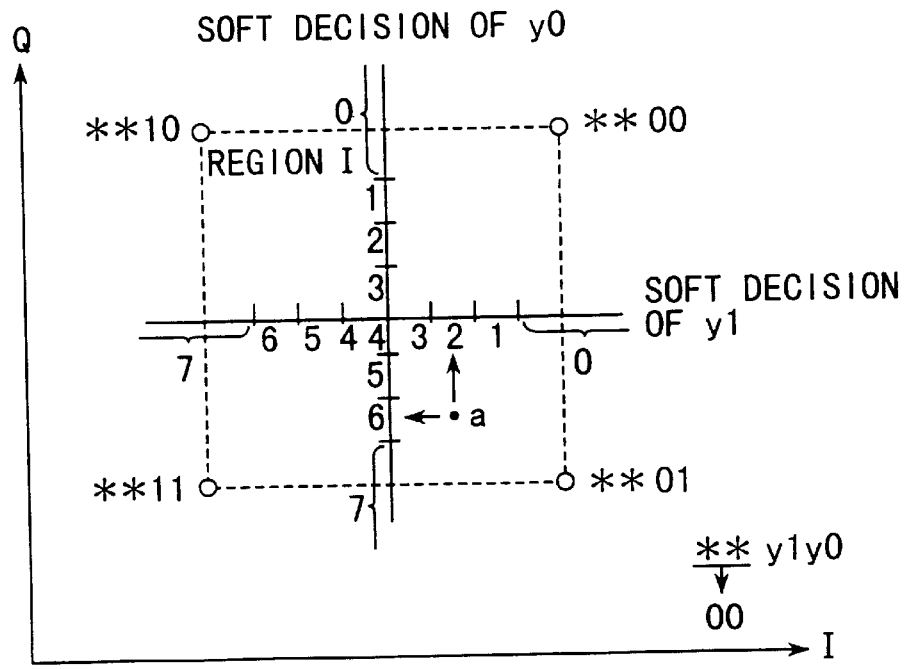
F I G. 5

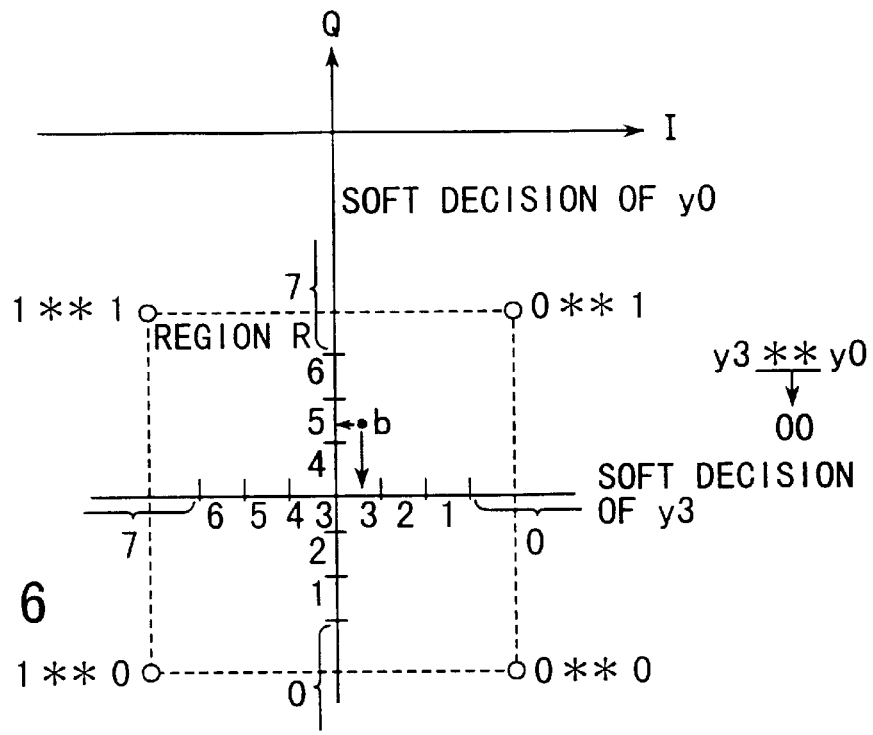
F I G. 6
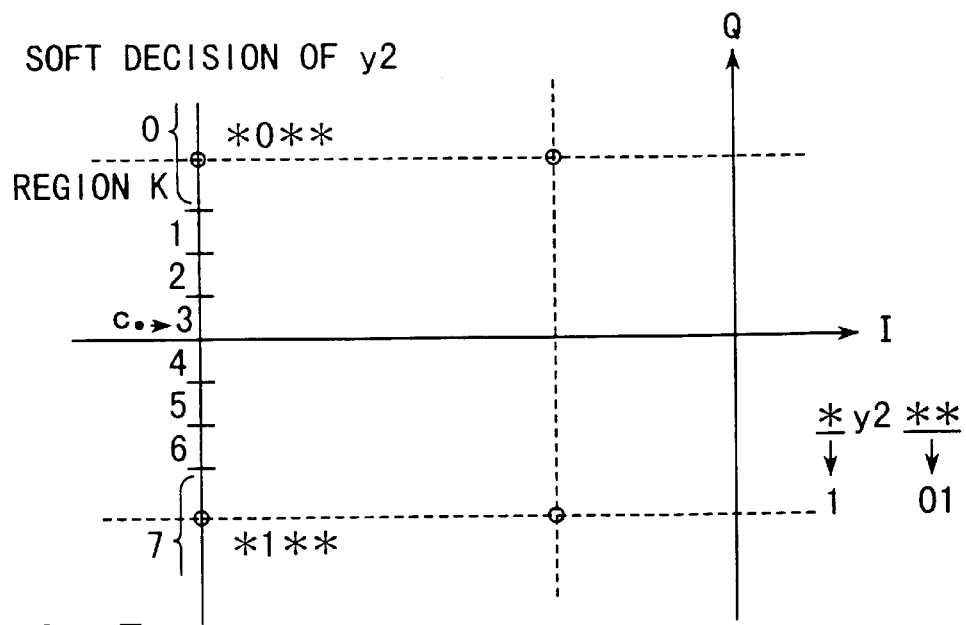
F I G. 7

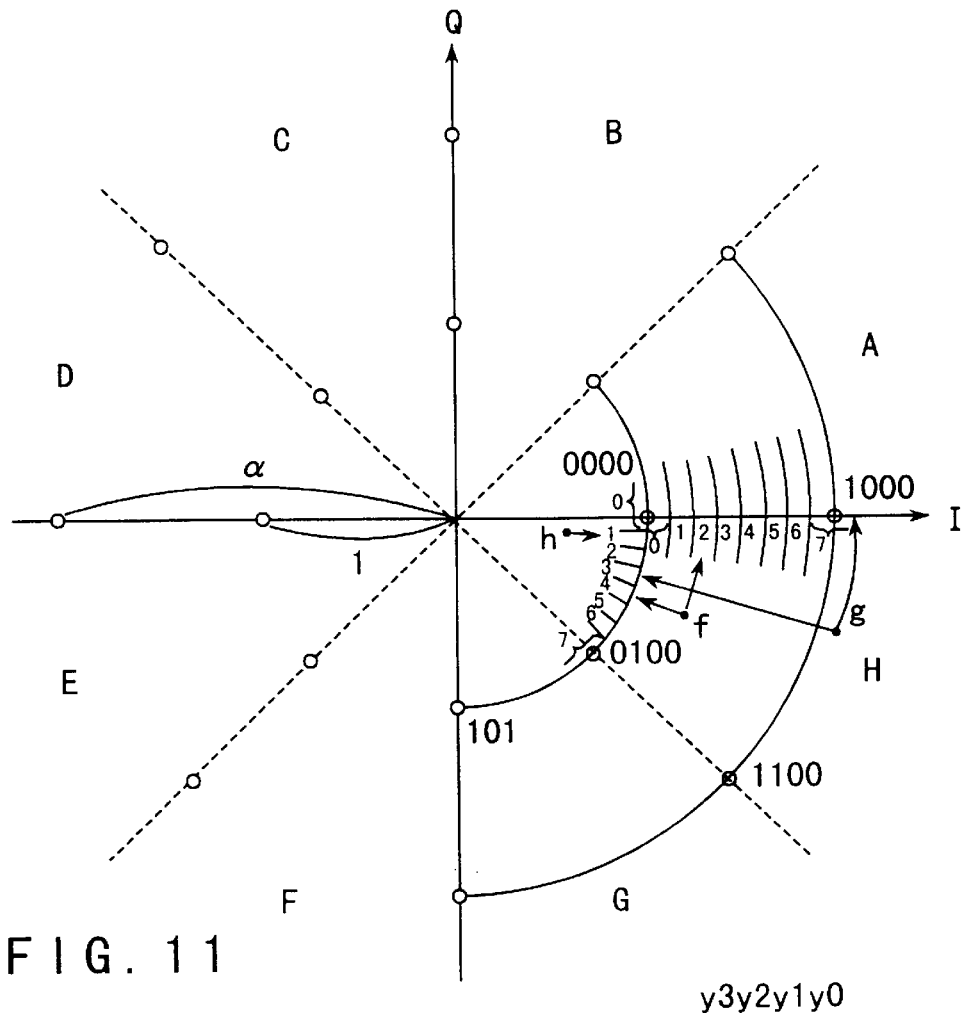
F I G. 11
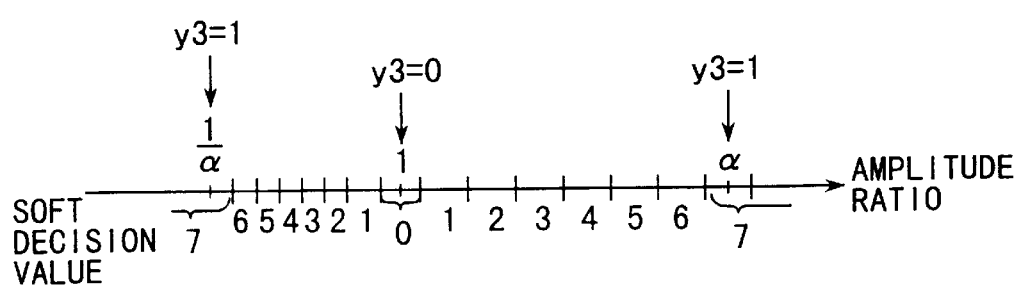
F I G. 12

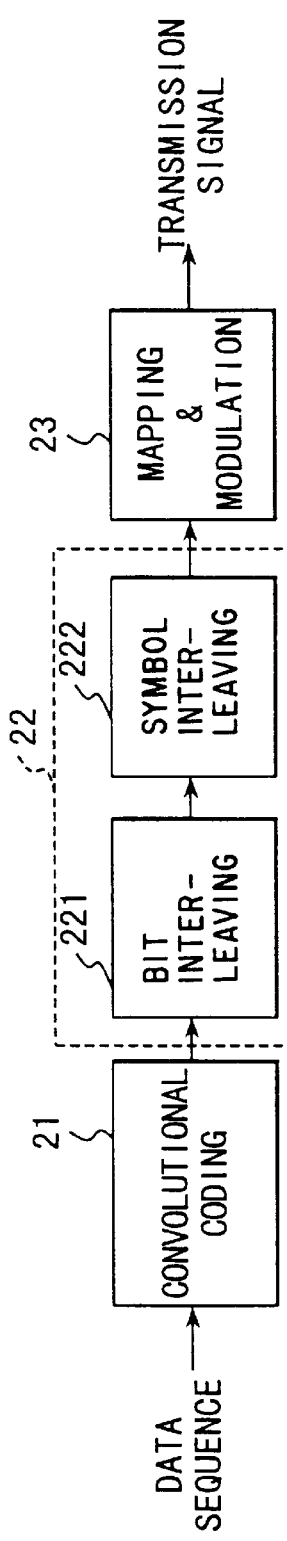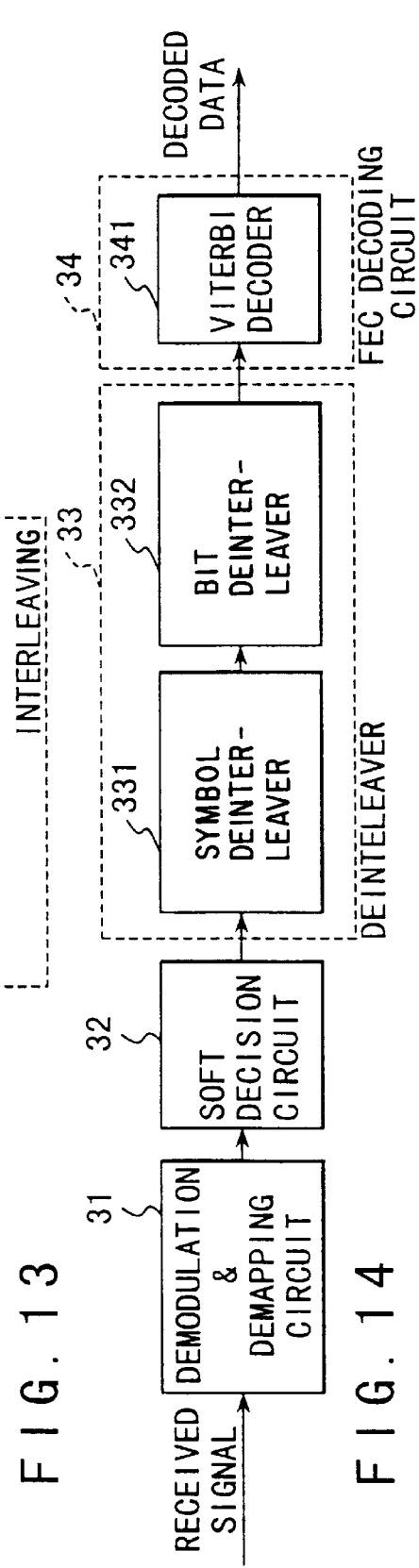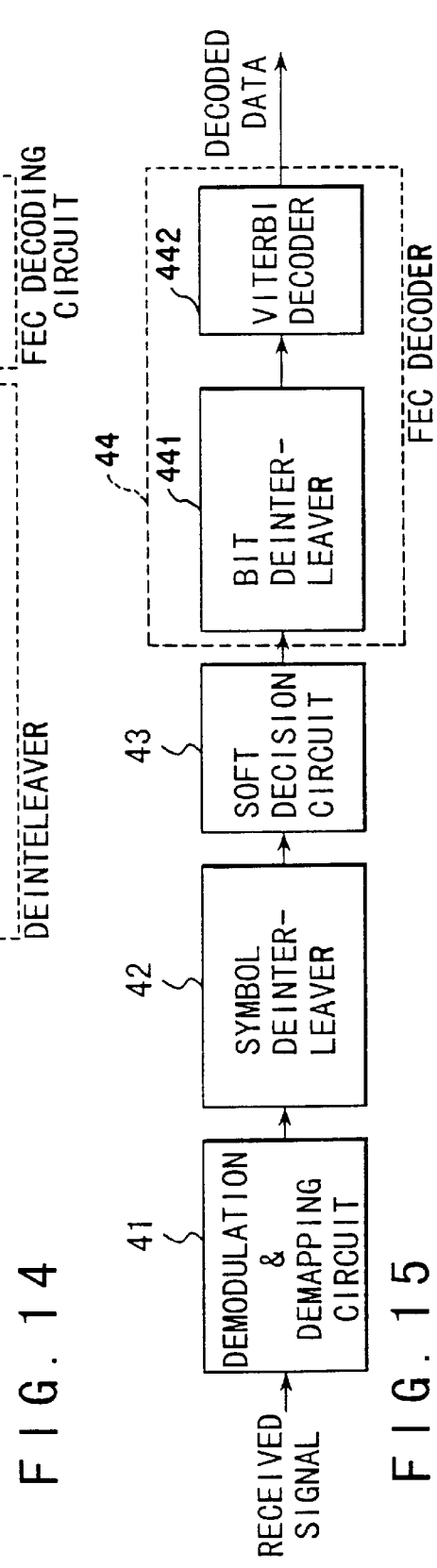

SOFT DECISION METHOD AND RECEIVER

BACKGROUND OF THE INVENTION

The present invention relates to a soft decision method and a receiving apparatus in multilevel (amplitude and/or phase) modulation.

In recent years, extensive studies have been made for digital television broadcasting. Among digital signal transmission techniques for digital television broadcasting, an FEC (Forward Error Correction) technique that can improve characteristics by performing soft-decision decoding of received symbols such as maximum-likelihood codes is receiving a lot of attention.

As an example of this technique, a transmission technique using convolutional coding-Viterbi decoding will be examined below. At the transmitter side, as shown in FIG. 1, a data sequence is convolutionally coded (11) and is then mapped and modulated (12) to obtain a transmission signal. On the receiver side, as shown in FIG. 2, the received signal is demodulated and demapped (13), and is then Viterbi-decoded (141) as FEC decoding (14) to obtain decoded data.

In a transmission technique using QPSK as a modulation method, as shown in, e.g., FIG. 3, 8-valued soft decision is done to improve the characteristics as compared to hard decision. In the example, shown in FIG. 3, when the bit is most reliable 0, a soft decision value 0 is set; when the bit is most reliable 1, a soft decision value 7 is set.

However, digital television broadcasting or the like tends to adopt modulation methods using a larger number of codes, but a soft decision method for multilevel (amplitude and/or phase) modulation has not prevailed. Hard decision cannot sufficiently exploit the correction performance of maximum-likelihood codes.

BRIEF SUMMARY OF THE INVENTION

It is an object of the present invention to provide a soft decision method which can solve the above-mentioned problems, can implement soft decision in multilevel (amplitude and/or phase) modulation, and can sufficiently utilize the correction performance of maximum-likelihood codes, and to provide a receiver that adopts the soft decision method.

In order to achieve the above object, a soft decision method according to the present invention performs the following processing.

(1) Bits having equal values for at least one symbol, which is used in a transmission system based on multilevel (amplitude and/or phase) modulation and serves as a candidate of a correct symbol determined by a region of signal space, are subjected to hard decision, and bits having different values for the symbol are subjected to soft decision.

(2) In the soft decision method by the processing of (1), when the multilevel modulation is multilevel QAM, predetermined four, two, or one symbol which serves as a candidate of a correct symbol is selected depending on the region, bits having equal values for the selected symbol are subjected to hard decision, and two, one, or zero bits having different values for the selected symbol are subjected to soft decision.

(3) In the soft decision method by the processing of (1), when the multilevel modulation is multilevel PSK including multilevel DAPSK and multilevel APSK, two, one, or zero bits of a total of two bits including one bit in an amplitude direction and one bit in a phase direction determined by a region of signal space for at least one symbol which serves as a candidate of a correct symbol determined depending on the region are subjected to soft decision, and other bits are subjected to hard decision.

(4) In the soft decision method by the processing of (1), when the multilevel modulation is multi-phase modulation, one or zero bit in a phase direction determined depending on the region for at least one symbol which serves as a candidate of a correct symbol determined depending on the region is subjected to soft decision, and other bits are subjected to hard decision.

A receiving apparatus according to the present invention has the following arrangement.

(5) A receiver for receiving a multilevel (amplitude and/or phase) modulated coded signal, and outputting a decoded signal, comprises a soft decision circuit for outputting a soft decision value obtained by a soft decision method of any one of (1) to (4).

(6) A receiver comprises a demodulation & demapping circuit for receiving a multilevel (amplitude and/or phase) modulated received signal, and outputting a demodulated and demapped signal, a soft decision circuit for receiving an output from the demodulation & demapping circuit and outputting a soft decision value obtained by a soft decision method of any one of (1) to (4), a deinterleaver for receiving an output from the soft decision circuit and outputting a deinterleaved signal, and an FEC (Forward Error Correction) decoder for receiving an output from the deinterleave circuit and outputting an FEC-decoded signal.

(7) A receiver comprises a demodulation & demapping circuit for receiving a multilevel (amplitude and/or phase) modulated received signal, and outputting a demodulated and demapped signal, a deinterleaver for receiving an output from the demodulation & demapping circuit, and outputting a deinterleaved signal, a soft decision circuit for receiving an output from the deinterleaver and outputting a soft decision value obtained by a soft decision method of any one of (1) to (4), and an FEC decoder for receiving an output from the soft decision circuit and outputting an FEC-decoded signal.

(8) A receiving apparatus comprises a demodulation & demapping circuit for receiving multilevel (amplitude and/or phase) modulated received signal, and outputting a demodulated and demapped signal, a symbol deinterleaver for receiving an output from the demodulation & demapping circuit, and outputting a signal deinterleaved in units of symbols, a soft decision circuit for receiving an output from the symbol deinterleaver and outputting a soft decision value obtained by a soft decision method of any one of (1) to (4), a bit deinterleaver for receiving an output from the soft decision circuit, and outputting a signal deinterleaved in units of bits, and an FEC decoder for receiving an output from the bit deinterleave circuit and outputting an FEC-decoded signal.

That is, in the soft decision method of (1) to (4), in the modulation including multi-phase modulation, multi-amplitude modulation and multi-phase-and-multi-amplitude modulation, if bits have equal values for several reliable symbols determined by the region of signal space, they are decided to be most reliable. However, bits that have different values for such symbols are subjected to soft decision. With this method, a receiver using a soft decision circuit of (5) to (8) can be realized, and BER (Bit Error Rate) vs. C/N characteristics can be improved by about 2 dB as compared to hard decision.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 4 shows the mapping in 16QAM according to the first embodiment of the present invention;

FIG. 5 shows the first example of a soft decision method of the first embodiment;

FIG. 6 shows the second example of the soft decision method of the first embodiment;

FIG. 7 shows the third example of the soft decision method of the first embodiment;

FIG. 11 shows the mapping in 16APSK and 16DAPSK according to the fourth and fifth embodiments of the present invention, and an example of a soft decision method in 16APSK in the fourth embodiment;

FIG. 12 shows an example of a soft decision method in 16DAPSK in the fifth embodiment;

FIG. 13 is a block diagram showing an example of signal processing at the transmitter side in a transmission system according to the sixth and seventh embodiments of the present invention;

FIG. 14 is a block diagram showing the arrangement of a receiver in the sixth embodiment; and FIG. 15 is a block diagram showing the arrangement of a receiver in the seventh embodiment.

DETAILED DESCRIPTION OF THE INVENTION

Figure 1:
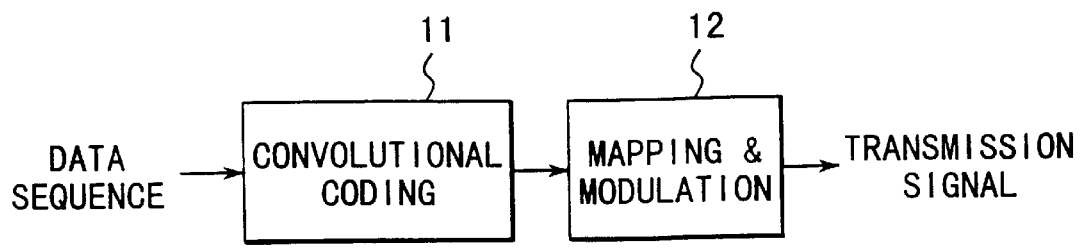
FIG. 1 is a block diagram showing an example of the arrangement of signal processing on the transmitter side in a conventional convolutional coding-Viterbi decoding transmission method.
Figure 2:
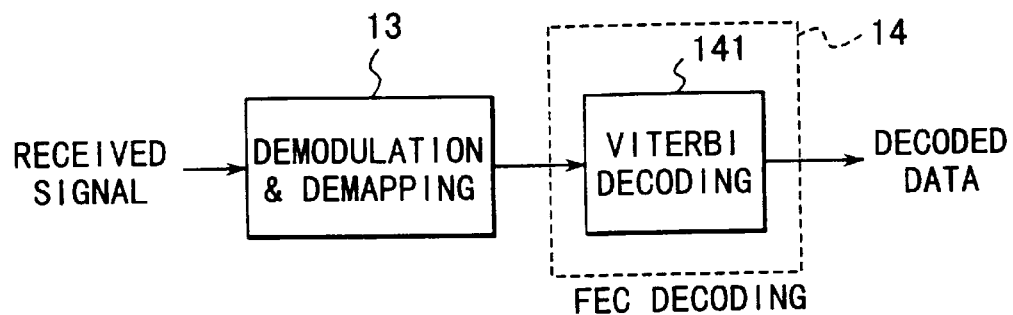
FIG. 2 is a block diagram showing an example of the arrangement of signal processing on the receiver side in the conventional convolutional coding-Viterbi decoding transmission method.
Figure 3:
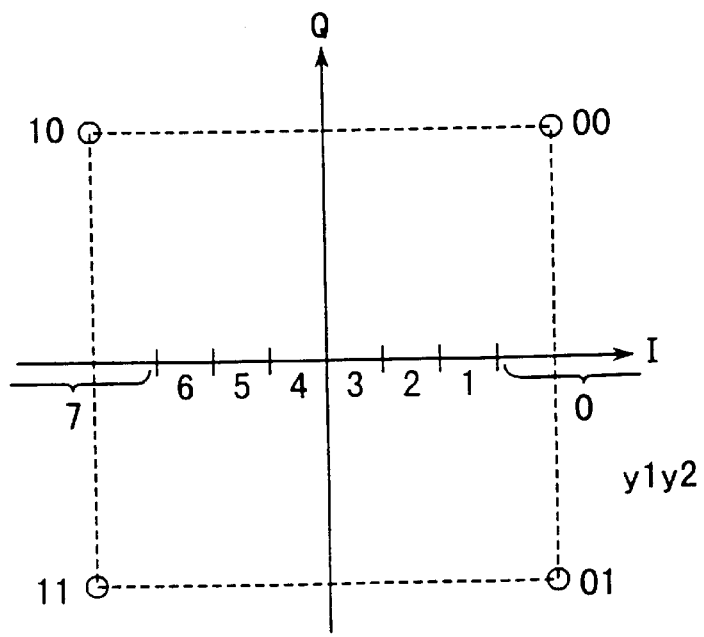
FIG. 3 shows an example of soft decision in conventional QPSK.

The preferred embodiments of the present invention will be described in detail hereinafter with reference to FIGS. 4 to 15.

First Embodiment

A soft decision method for 16QAM according to the first embodiment of the present invention will be explained below with reference to FIGS. 4 to 7. FIG. 4 shows an example of gray code mapping based on 16QAM, and FIGS. 5 to 7 are enlarged views of regions I, R, and K shown in FIG. 4. In this case, the bits to be subjected to soft decision differ in units of regions A to Y shown in FIG. 4.

In FIG. 4, when the received symbol is located at the position of point a, since the symbols at the four corners of that region I have common upper 2 bits y3 and y2, it is decided that bits y3 and y2 are most reliable 0. That is, a soft decision value=0 is obtained for y3 and y2. As for lower 2 bits y1 and y0, a soft decision value=2 is obtained for y1 by soft decision in the I-axis direction, and a soft decision value=6 is obtained for y0 by soft decision in the Q-axis direction, as shown in FIG. 5.

When the received symbol is located at the position of point b, since the symbols at the four corners of that region R have common 2 bits y2 and y1, it is decided that bits y2 and y1 are most reliable 1. That is, a soft decision value=7 is obtained for y2 and y1. As for other 2 bits y3 and y0, a soft decision value=3 is obtained for y3 by soft decision in the I-axis direction, and a soft decision value=5 is obtained for y0 by soft decision in the Q-axis direction, as shown in FIG. 6.

Like at points a and b, when the received symbol is located within region G, H, I, L, M, N, Q, R, or S, two out of four bits are decided to be most reliable, and a soft decision value=0 or 7 is obtained for these bits. As for the remaining 2 bits, a soft decision value=0 to 7 is obtained by soft decision in the I- or Q-axis direction.

When the received symbol is located within region E, it is decided that all the 4 bits are most reliable 0, and their soft decision values=0 are obtained. Similarly, when the received symbol is located with region A, E, U, or Y, all the 4 bits are decided to be most reliable, and their soft decision values=0 or 7 are obtained.

When the received symbol is located at the position of point c, since the symbols at two corners of that region K have common bits y3, y1, and y0, it is decided that bits y3, y1, and y0 are most reliable 1 or 0. That is, a soft decision value=7 is obtained for y3, a soft decision value 0 for y1, and a soft decision value=7 for y0. As for y2, as shown in FIG. 7, a soft decision value=3 is obtained by soft decision in the Q-axis direction.

Like at point c, when the received symbol is located within region B, C, D, F, J, K, O, P, T, V, W, or X, three out of four bits are decided to be most reliable, and their soft decision values=0 or 7 are obtained. As for the remaining 1 bit, a soft decision value=0 to 7 is obtained by soft decision in the I- or Q-axis direction.

Note that the soft decision value is not limited to an 8-value, but similar decision methods using other values may be used. Also, a nonlinear soft decision method may be used. In this embodiment, the soft decision value is expressed by 0 to 7 but may be expressed by binary values "000" to "111". Furthermore, 9-valued soft decision ranging from −4 to 4 may be used.

Second Embodiment

Figure 8:
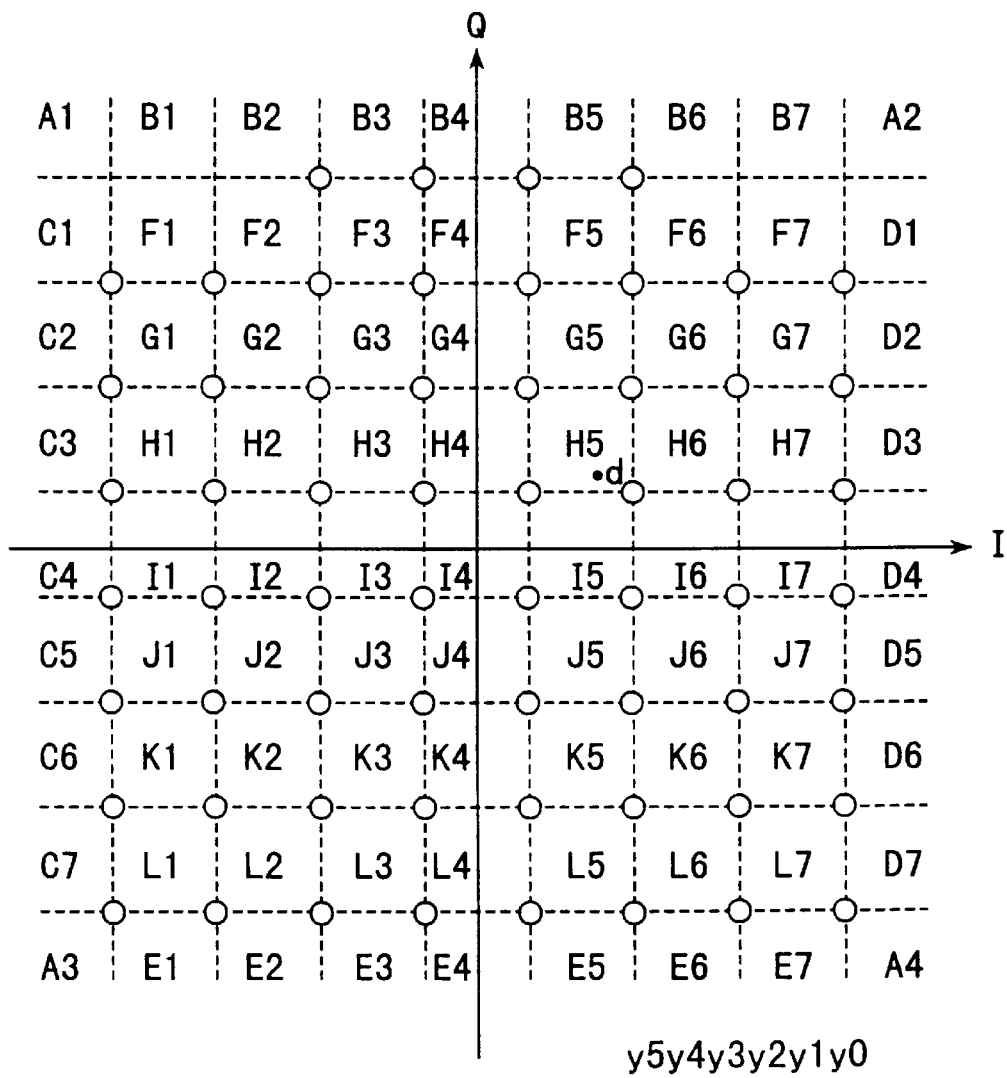
FIG. 8 shows the mapping in 64QAM according to the second embodiment of the present invention.

A soft decision method for 64QAM according to the second embodiment of the present invention will be described below with reference to FIGS. 8 and 9. FIG. 8 shows an example of gray code mapping based on 64QAM, and FIG. 9 is an enlarged view of region H5 shown in FIG. 8.

Figure 9:
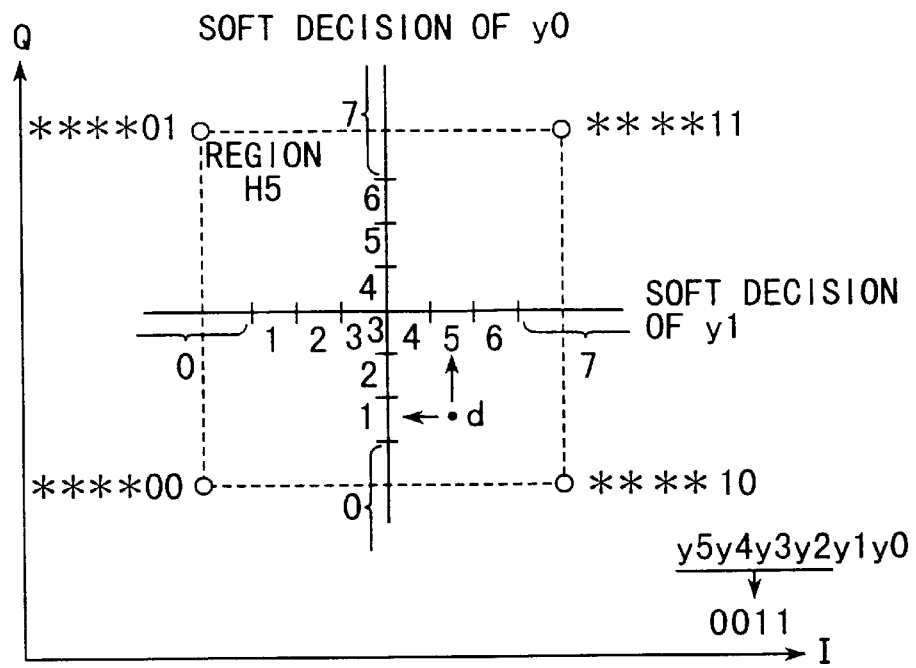
FIG. 9 shows an example of a soft decision method in the second embodiment.

In FIG. 8, when the received symbol is located at the position of point d, since the symbols at the four corners of that region H5 have common upper 4 bits, as shown in FIG. 9, these bits are decided to be most reliable. More specifically, their soft decision values=0 or 7 are obtained. A soft decision value=0 is obtained for y5, a soft decision value=0 for y4, a soft decision value=7 for y3, and a soft decision value=7 for y2. As for lower 2 bits, as shown in FIG. 9, a soft decision value=5 is obtained for y1 by soft decision in the I-axis direction, and a soft decision value=1 is obtained for y0 by soft decision in the Q-axis direction.

Like at point d, when the received symbol is located within one of regions F1 to F7, G1 to G7, H1 to H7, I1 to I7, J1 to J7, K1 to K7, and L1 to L7, four bits of the symbols at the four corners of each region are decided to be most reliable, and soft decision values=0 or 7 are obtained. As for the remaining 2 bits, soft decision is done in the I- or Q-axis direction to obtain a soft decision value=0 to 7.

When the received symbol is located within one of regions A1 to A4, it is decided that all the 6 bits in the symbols at the one corner of each region are most reliable, and their soft decision values=0 or 7 are obtained.

When the received symbol is located within one of regions B1 to B7, C1 to C7, D1 to D7, and E1 to E7, it is decided that 5 bits in the symbols at the two corners of each region are reliable, and their soft decision values=0 or 7 are obtained. As for the remaining 1 bit, soft decision is done in the I- or Q-axis direction to obtain a soft decision value=0 to 7.

In this embodiment as well, the soft decision value is not limited to an 8-value, but similar decision methods using other values may be used. Also, a nonlinear soft decision method may be used. In this embodiment, the soft decision value is expressed by 0 to 7 but may be expressed by binary values "000" to "111". Furthermore, 9-valued soft decision ranging from −4 to 4 may be used.

Third Embodiment

Figure 10:
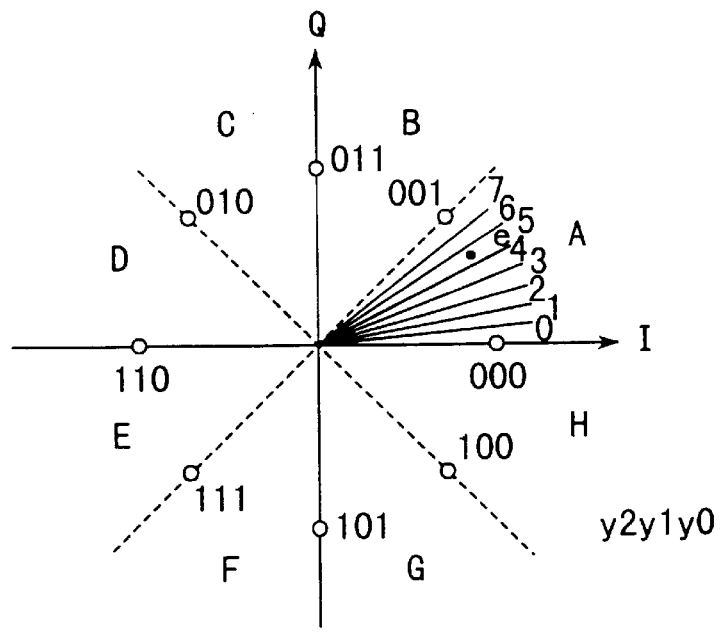
FIG. 10 shows the mapping in 8PSK and an example of a soft decision method according to the third embodiment of the present invention.

A soft decision method for 8PSK according to the third embodiment of the present invention will be described below with reference to FIG. 10. FIG. 10 shows an example of gray code mapping based on 8PSK.

In FIG. 10, when the received symbol is located at the position of point e, since the two symbols in that region A have common upper 2 bits, they are decided to be most reliable. That is, their soft decision values=0 are obtained. As for the lower 1 bit, as shown in FIG. 10, a soft decision value=5 is obtained based on phase.

Similarly, as for 2 bits in two symbols included in each of regions A to H, they are decided to be most reliable, i.e., soft decision values=0 or 7 are obtained.

In this embodiment as well, the soft decision value is not limited to an 8-value, but similar decision methods using other values may be used. Also, a nonlinear soft decision method may be used. In this embodiment, the soft decision value is expressed by 0 to 7 but may be expressed by binary values "000" to "111". Furthermore, 9-valued soft decision ranging from −4 to 4 may be used.

Fourth Embodiment

A soft decision method for 16APSK according to the fourth embodiment of the present invention will be described below with reference to FIG. 11. FIG. 11 shows an example of gray code mapping based on 16DAPSK to be described in the next embodiment together with 16APSK. In this embodiment, decisions are separately done in the phase and amplitude directions. That is, y2, y1, and y0 are bits in the phase direction, and y3 is a bit in the amplitude direction.

In FIG. 11, when the received symbol is located at the position of point f, since the four symbols in that region H have common lower 2 bits, they are decided to be most reliable. That is, soft decision values=0 are obtained for y1 and y0. Also, a soft decision value=4 is obtained for y2 by soft decision in the phase direction, and a soft decision value=2 is obtained for y3 by soft decision in the amplitude direction.

When the received symbol is located at point g, since the four symbols in region H have common lower 2 bits, they are decided to be most reliable. That is, soft decision values=0 are obtained for y1 and y0. Also, a soft decision value=3 is obtained for y2 by soft decision in the phase direction, and a soft decision value=7 is obtained for y3 by soft decision in the amplitude direction.

When the received symbol is located at point h, since the four symbols in region H have common lower 2 bits, they are decided to be most reliable. That is, soft decision values=0 are obtained for y1 and y0. Also, a soft decision value=1 is obtained for y2 by soft decision in the phase direction, and a soft decision value=0 is obtained for y3 by soft decision in the amplitude direction.

In this embodiment as well, the soft decision value is not limited to an 8-value, but similar decision methods using other values may be used. Also, a nonlinear soft decision method may be used. In this embodiment, the soft decision value is expressed by 0 to 7 but may be expressed by binary values "000" to "111". Furthermore, 9-valued soft decision ranging from −4 to 4 may be used.

Fifth Embodiment

A soft decision method for 16DAPSK according to the fifth embodiment of the present invention will be described below with reference to FIGS. 11 and 12. In this embodiment as well, decisions are separately done in the phase and amplitude directions. That is, y2, y1, and y0 are bits in the phase direction, and y3 is a bit in the amplitude direction. The transmitter differentially codes in advance an 8-value defined by y2, y1, and y0 by gray code addition. Bit y3 is also differentially coded at the transmitter side.

The receiver calculates the phase difference between two symbols which have been delay-detected or the phase difference between two symbols which have been synchronous-detected, soft decision values 0 or 7 are obtained for most reliable 2 bits of bits y2, y1, and y0 in the same manner as in the fourth embodiment. A soft decision value=0 to 7 is obtained for the remaining 1 bit.

Further, the receiver calculates the amplitude ratio between the two symbols which have been delay-detected or the amplitude ratio between the two symbols which have been synchronous-detected. Based on this amplitude ratio, a soft decision value for y3 is calculated. In this case, if y3 is decided to obtain a hard decision value=0 when the amplitude ratio is 1, and if y3 is decided to obtain a hard decision value=1 when the amplitude ratio is α or 1/α, soft decision is done, as shown in FIG. 12.

In this embodiment, the boundaries between adjacent soft decision values may have an equal interval, linear interval, or nonlinear interval.

Sixth Embodiment

A receiver according to the sixth embodiment of the present invention will be described below with reference to FIG. 14. In this embodiment, 16QAM is used and the transmitter performs coding in a procedure shown in FIG. 13.

At the transmitter side, a data sequence is convolutionally coded (21), and is then interleaved (22). The interleaving is done in units of bits (221) and, thereafter, is done in units of symbols, i.e., in units of 4 bits (222). Finally, the interleaved data sequence is mapped and modulated by 16QAM modulation to obtain a transmission signal (23).

FIG. 14 shows the arrangement of a receiver used in the above-mentioned channel coding system.

Referring to FIG. 14, a demodulation & demapping circuit 31 receives an input signal, and demodulates and demaps the received signal to output IQ data. A soft decision circuit 32 receives the output from the demodulation & demapping circuit 31, and performs soft decision by the soft decision method of the first embodiment to output a soft decision value.

A deinterleaver 33 receives the output from the soft decision circuit 32. In this circuit, a symbol deinterleaver 331 deinterleaves data in units of symbols, and a bit deinterleaver 332 deinterleaves data in units of bits. An FEC decoder 34 receives the output from the deinterleaver 33, and a Viterbi decoder 341 performs soft decision Viterbi decoding to output decoded data.

The processing contents of the above arrangement will be explained below.

For example, a soft decision value per bit of information is expressed by 3 bits. In this case, the demodulation & demapping circuit 31 demodulates and demaps the received signal to obtain output IQ data consisting of 5 bits or more. Subsequently, the soft decision circuit 32 obtains a 3 bit soft decision value per information bit on the basis of the IQ data.

In the deinterleaver 33, the symbol deinterleaver 331 deinterleaves in units of 12 bits, i.e., 3 bits (soft decision value)×4 bits (information), and the bit deinterleaver 332 deinterleaves in units of 3 bits, i.e., 3 bits (soft decision value)×1 bit (information).

The FEC decoding circuit 34 receives the bit deinterleaved soft decision values for 2 bits of information, i.e., in units of 6 bits, sequentially performs soft decision Viterbi decoding, and outputs decoded data.

According to the receiver with the above arrangement, since the soft decision circuit 32 performs soft decision by the soft decision method of the first embodiment, error correction by soft decision Viterbi decoding can be performed, and the correction performance of maximum-likelihood codes can be fully utilized.

In this embodiment, deinterleaving is performed after soft decision. Alternatively, the soft decision circuit 32 and the deinterleaver 33 in FIG. 14 may replace each other, so that soft decision may be done after deinterleaving.

Seventh Embodiment

A receiver according to the seventh embodiment of the present invention will be described below with reference to FIG. 15. In this embodiment as well, 16QAM is used and the transmitter performs coding in a procedure shown in FIG. 13.

FIG. 15 shows another arrangement of the receiver used in the above-mentioned channel coding system.

Referring to FIG. 15, a demodulation & demapping circuit 41 receives an input signal, and demodulates and demaps the received signal to output IQ data. A symbol deinterleaver 42 receives the output from the demodulation & demapping circuit 41, and deinterleaves the input signal in units of symbols to output deinterleaved data. A soft decision circuit 43 receives the output from the symbol deinterleaver 42, executes the soft decision method of the first embodiment, and outputs a soft decision value.

The soft decision value is input to the FEC decoder 44.

The FFC decoder 44 comprises a bit deinterleaver 441 and a Viterbi decoder 442. The bit deinterleaver 441 deinterleavers the soft decision value output from the soft decision circuit 43. The Viterbi decoder 442 performs Viterbi decoding on the output of the bit deinterleaver 441, i.e., the deinterleaved soft decision value.

The processing contents of the above arrangement will be described below.

For example, a soft decision value per bit of information is expressed by 3 bits. In this case, the demodulation & demapping circuit 41 demodulates and demaps the received signal to obtain output IQ data consisting of 5 bits or more. Subsequently, the symbol deinterleave circuit 42 performs symbol deinterleave in units of a total of 10 bits, i.e., two 5 bit IQ data.

The soft decision circuit 43 obtains a 3 bit soft decision value per information bit on the basis of the IQ data. The soft decision value is input to the EFC decoder 44. In the FEC decoder 44, the bit deinterleaver 441 deinterleaves the soft decision value in units of 3 bits, i.e., 3 bits (soft decision value×1 bit (information). Also in the EFC decoder 44, the Viterbi decoder 442 receives the soft decision values for 2 bits of information, in units of 6 bits, performs Viterbi decoding on the soft decision values sequentially, and outputs the soft decision values thus decoded.

According to the receiver of the above arrangement as well, since the soft decision circuit 43 performs soft decision by the soft decision method of the first embodiment, error correction by soft decision Viterbi decoding can be performed, and the correction performance of maximum-likelihood codes can be fully utilized.

The receiver in FIG. 14 performs symbol deinterleaving in units of 12 bits, but the receiver in FIG. 15 can perform it in units of 10 bits, thus realizing a receiver with a small hardware scale.

Other Embodiments

In the sixth and seventh embodiments, 16QAM is used as the modulation method, and the soft decision method of the first embodiment is used. In correspondence with the modulation methods (64QAM, 8PSK, 16APSK, and 16DAPSK), the soft decision methods of the second to fifth embodiments can be used to obtain the same effects as in the above embodiments.

Of course, even for other modulation methods including multi-phase modulation, multi-amplitude modulation, and multi-phase-and-multi-amplitude modulation if bits have equal values for several probable symbols determined by the region of signal space, they are decided to be probable. However, bits that have different values for such symbols are subjected to soft decision. In this way, soft decision decoding can be implemented, and the correction performance of maximum-likelihood codes can be fully utilized.

As described above, according to the present invention, a soft decision method that can implement soft decision in multi-valued modulation and can fully utilize the correction performance of maximum likelihood coding can be provided, and at the same time, a receiving apparatus that adopts the soft decision method can be provided.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

What is claimed is:

1. A soft decision method, wherein bits having equal values for at least one symbol, which is used in a transmission system based on multilevel (amplitude and/or phase) modulation subjected to mapping with gray encoding, and serves as a candidate of a correct symbol determined by that region of signal space in which a received symbol is located, are subjected to soft decision in units of one bit, and one of a minimum value and maximum value is selected for each of the bits in the soft decision, thereby determining said one of the minimum and maximum values as the value of said each bit, and bits having different values for the symbol are subjected to soft decision.

2. A method according to claim 1, wherein when the multilevel modulation is multilevel QAM, predetermined four, two, or one symbol which serves as a candidate of a correct symbol is selected depending on the region in which the received symbol is located, bits having equal values for the selected symbol are subjected to soft decision in units of one bit, and said one of the minimum value and the maximum value is selected for each of the bits in the soft decision, thereby determining said one of the minimum and maximum values as the value of said each bit, and two, one, or zero bits having different values for the selected symbol are subjected to soft decision.

3. A method according to claim 1, wherein when the multilevel modulation is multilevel PSK including multilevel DAPSK and multilevel APSK, two, one, or zero bits of a total of two bits including one bit in an amplitude direction and one bit in a phase direction determined by a region of signal space for at least one symbol which serves as a candidate of a correct symbol determined depending on the region in which the received symbol is located are subjected to soft decision, and other bits are subjected to soft decision in units of one bit, and said one of the minimum value and the maximum value is selected for each of the bits in the soft decision, thereby determining said one of the minimum and maximum values as the value of said each bit.

4. A method according to claim 1, wherein when the multilevel modulation is multi-phase modulation, one or zero bit in a phase direction determined depending on the region for at least one symbol which serves as a candidate of a correct symbol determined depending on the region in which the received symbol is located is subjected to soft decision, and other bits are subjected to soft decision in units of one bit, and said one of the minimum value and the maximum value is selected for each of the bits in the soft decision, thereby determining said one of the minimum and maximum values as the value of said each bit.

5. A receiver for receiving a multilevel (amplitude and/or phase) modulated coded signal subjected mapping with a gray coding, and outputting a decoded signal, comprising:

a soft decision circuit for outputting a soft decision value obtained by a soft decision method of any one of claims 1 to 4.

6. A receiver comprising:

a demodulation & demapping circuit for receiving a multilevel (amplitude and/or phase) modulated received signal subjected mapping with gray coding, and outputting a demodulated and demapped signal;

a soft decision circuit for receiving an output from said demodulation & demapping circuit and outputting a soft decision value obtained by a soft decision method of any one of claims 1 to 4;

a deinterleaver for receiving an output from said soft decision circuit and outputting a deinterleaved signal; and an FEC (Forward Error Correction) decoder for receiving an output from said deinterleaver and outputting an FEC-decoded signal.

7. A receiver comprising:

a demodulation & demapping circuit for receiving a multilevel (amplitude and/or phase) modulated received signal subjected mapping with gray coding, and outputting a demodulated and demapped signal;

a deinterleaver for receiving an output from said demodulation & demapping circuit, and outputting a deinterleaved signal;

a soft decision circuit for receiving an output from said deinterleave circuit and outputting a soft decision value obtained by a soft decision method of any one of claims 1 to 4; and an FEC (Forward Error Correction) decoder for receiving an output from said soft decision circuit and outputting an FEC-decoded signal.

8. A receiver comprising:

a demodulation & demapping circuit for receiving a multilevel (amplitude and/or phase) modulated received signal subjected mapping with gray coding, and outputting a demodulated and demapped signal;

a symbol deinterleaver for receiving an output from said demodulation & demapping circuit, and outputting a signal deinterleaved in units of symbols;

a soft decision circuit for receiving an output from said symbol deinterleaver and outputting a soft decision value obtained by a soft decision method of any one of claims 1 to 4;

a bit deinterleaver for receiving an output from said soft decision circuit, and outputting a signal deinterleaved in units of bits; and an FEC (Forward Error Correction) decoder for receiving an output from said bit deinterleaver and outputting an FEC-decoded signal.

* * * * *